United States Patent [19]
Bortolotto et al.

[11] Patent Number: 5,101,089
[45] Date of Patent: Mar. 31, 1992

[54] LASER MACHINE FOR CUTTING AND WELDING

[75] Inventors: Virgilio Bortolotto, Pino Torinese; Alberto D. Piane, Bruino; Fabrizio Grassi, Turin, all of Italy

[73] Assignee: Prima Industries S.p.A., Turin, Italy

[21] Appl. No.: 559,054

[22] Filed: Jul. 30, 1990

[30] Foreign Application Priority Data

Aug. 1, 1989 [IT] Italy ................... 67654 A/89

[51] Int. Cl.$^5$ ..................................... B23K 26/00
[52] U.S. Cl. ........................ 219/121.63; 219/121.67
[58] Field of Search ............. 219/121.7, 121.71, 121.6, 219/121.85, 121.63, 121.64, 121.67, 121.72; 372/701

[56] References Cited

U.S. PATENT DOCUMENTS

| | | | |
|---|---|---|---|
| 4,031,351 | 6/1977 | Martin | 215/121.84 X |
| 4,724,297 | 2/1988 | Nielsen | 219/121.84 X |
| 4,782,496 | 11/1988 | Couturier | 372/701 X |
| 4,808,791 | 2/1989 | Puzzo et al. | 219/121.85 X |

FOREIGN PATENT DOCUMENTS 0024582 2/1984 Japan ........................ 219/137.63

Primary Examiner—C. L. Albritton

[57] ABSTRACT

A machine for relatively displacing in space a workpiece and a laser head having a nozzle supplying a laser beam together with a stream of gas suitable for the operation being performed (cutting or welding); which machine provides for switching fully automatically, and without changing the laser head, from one type of operation to the other, by virtue of the nozzle presenting a removable portion designed according to the type of operation being performed, and first releasable gripping means for gripping the removable portion; and by virtue of the machine comprising a nozzle refitting station having second releasable gripping means for gripping the removable portion, and means for selectively connecting/disconnecting the first and second gripping means.

9 Claims, 4 Drawing Sheets

LASER MACHINE FOR CUTTING AND WELDING

BACKGROUND OF THE INVENTION

The present invention relates to a laser machine, in particular for both cutting and welding, comprising a laser head with a nozzle for directing on to the workpiece a laser beam together with a gas jet suitable for the operation being performed (cutting or welding); and a numerical control system for moving the laser head in relation to the workpiece/s along continuous programmable trajectories.

Currently used laser machines of the aforementioned type are known to be used predominantly or exclusively for either cutting (e.g. metal or plastic sheet) or welding. Each of these operations, in fact, requires specific equipment comprising a laser head with a nozzle specially designed for the operation in question and, more importantly, for ensuring the production of an optimum gas jet about the laser beam. When cutting, for example, the tip of the nozzle must be so designed as to direct a fairly high-speed jet of oxidizing gas on to the workpiece, which gas provides for improving vaporization of the material in the cutting area, as well as for shielding the focusing lens on the laser head from the gas produced during cutting. When welding, on the other hand, the tip of the nozzle must be so designed as to produce a fairly low-speed jet of protective gas (argon or nitrogen), for ensuring the static nature of the weld pool and flow conditions between the tip and workpiece are unaffected.

If the same machine is used for both cutting and welding, when switching from one to the other, the machine must be stopped for manually changing the laser head or part of it. This inevitably results in impaired flexibility, high cost and organizational problems, especially when a number of different laser heads must be stored for performing different operations.

SUMMARY OF THE INVENTION

The aim of the present invention is to provide a laser machine of the aforementioned type designed to perform both cutting and welding operations with no need for changing the laser head or at any rate with no need for prolonged stoppage of the machine for manual retooling, said retooling, if necessary, being performed automatically by the machine itself.

With this aim in view, according to the present invention, there is provided a laser machine for performing mechanical operations, in particular, cutting and welding, said machine comprising a laser head having a nozzle supplying a laser beam and a stream of gas suitable for the operation being performed; and means for moving said laser head relatively in space, within a given work volume, in relation to at least one workpiece; characterised by the fact that said nozzle comprises a removable portion designed according to the type of operation being performed; and first releasable gripping means for securing said removable portion integral with said nozzle; said machine also comprising a nozzle refitting station located inside said work volume and having second releasable gripping means for securing said removable portion of said nozzle integral with said station; and means for selectively connecting/disconnecting said first and second gripping means.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
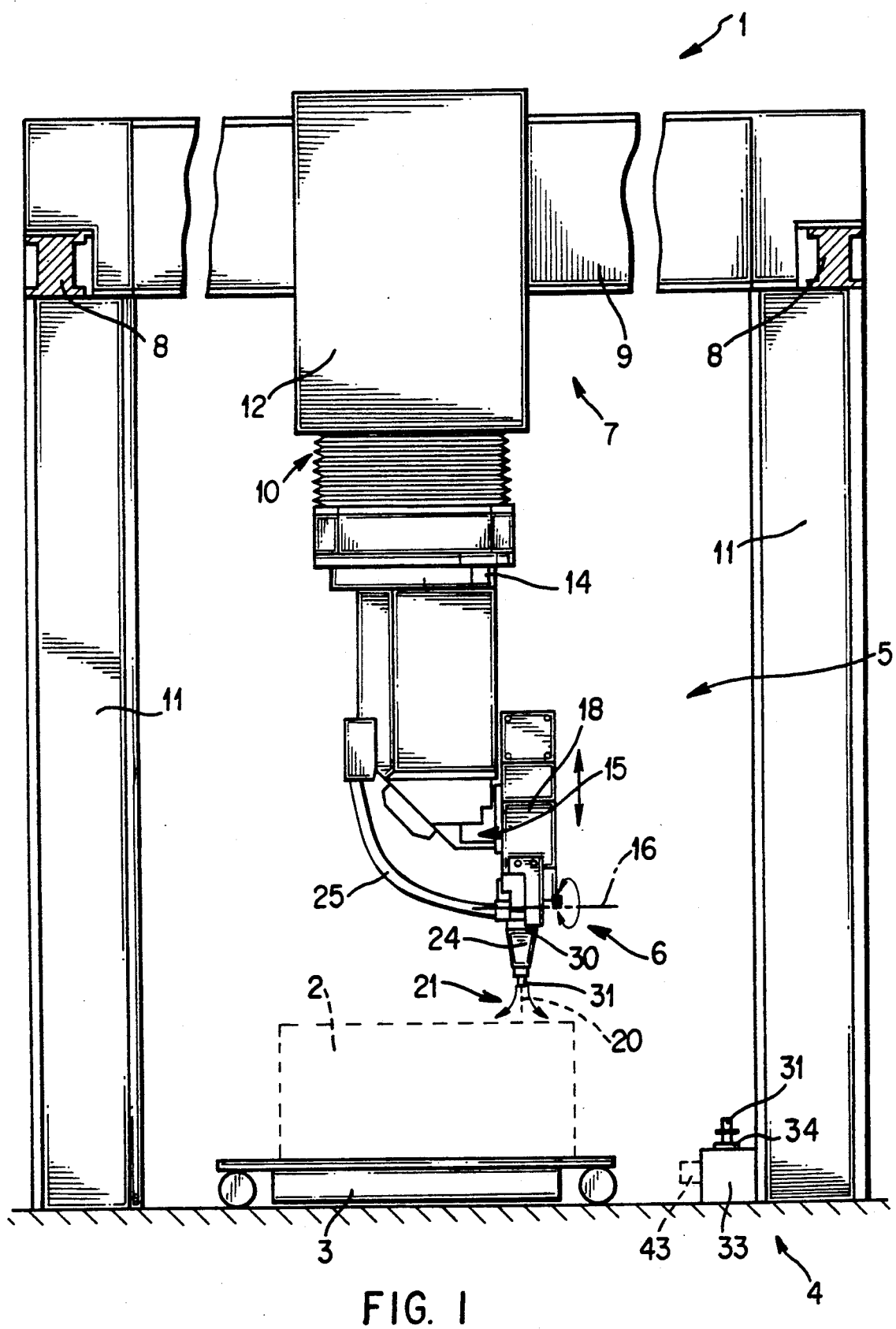
FIG. 1 shows a schematic view, not to scale, of a machine in accordance with the present invention.
Figure 2:
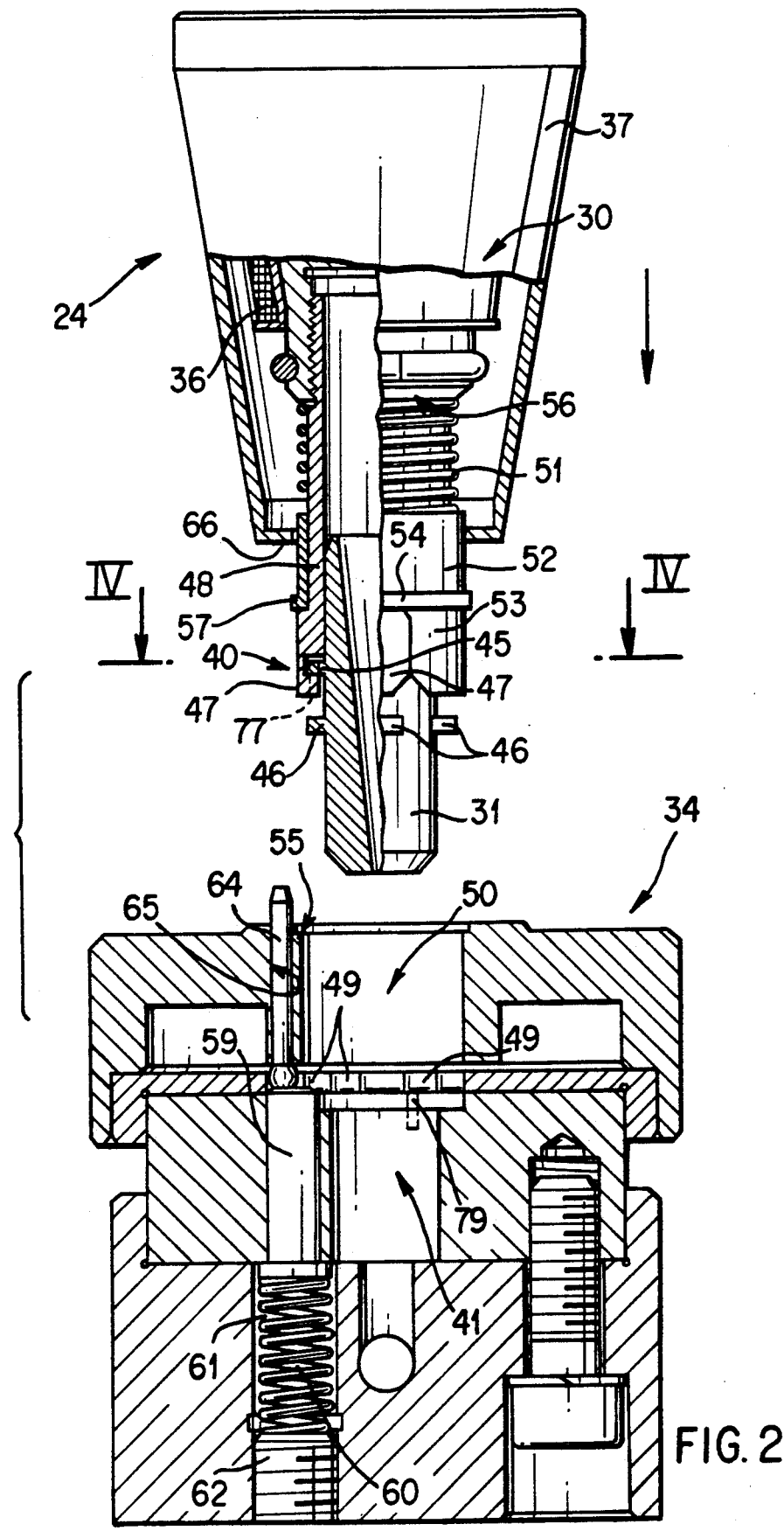
FIG. 2 shows a large-scale view of details on the FIG. 1 machine in a first operating position.
Figure 3:
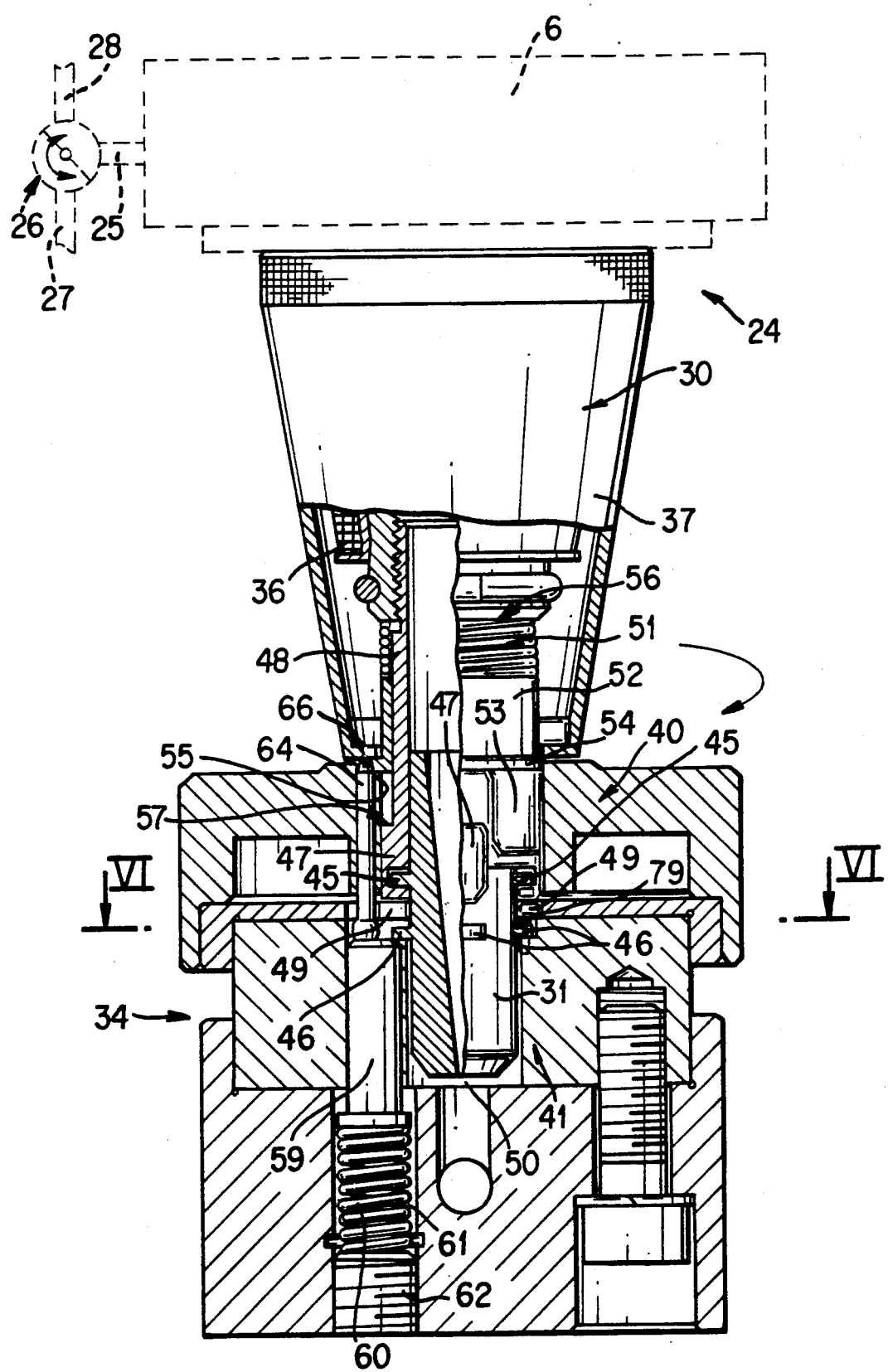
FIG. 3 shows the FIG. 2 details in a further operating position.
Figure 4:
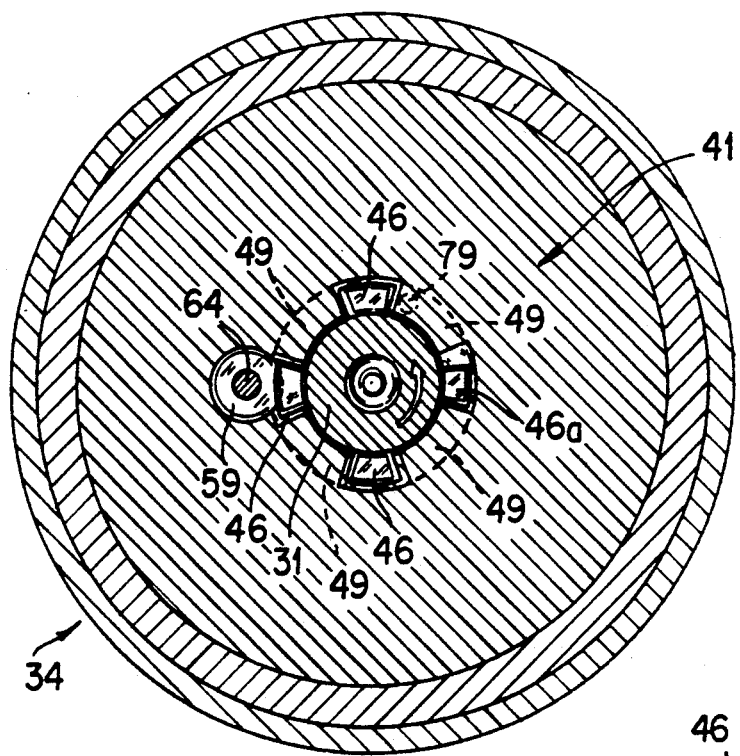
FIGS. 4 and 5 show respective sections of the FIG. 3 details along line IV—IV.
Figure 5:
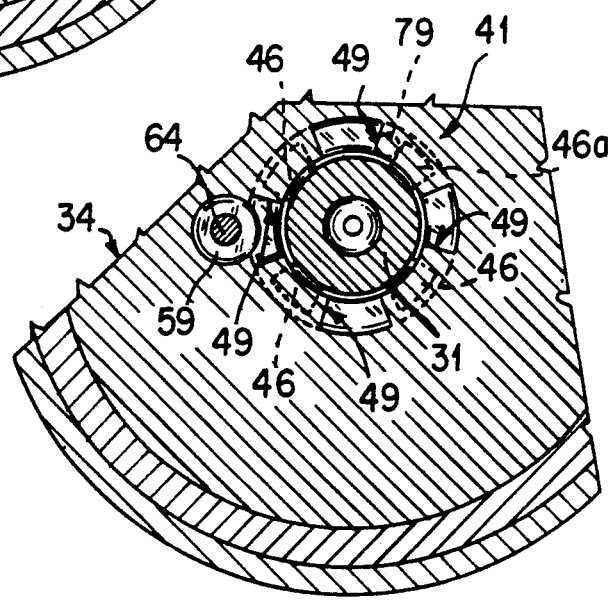

Number 1 in FIGS. 1, 2 and 3 indicates a laser machine for cutting or welding a workpiece 2 on a suitably equipped worktable 3 located inside a work volume 5 defined by structure 4. Machine 1 is designed to support a laser head 6 inside work volume 5, and to enable the same to travel in relation to workpiece 2 and table 3 along any continuous programmable trajectory. In the non-limiting example shown, laser head 6 is supported in mobile manner on a gantry type structure 4 comprising a device 7 for moving laser head 6 within work volume 5 along three cartesian axes, e.g. parallel to respective slideways defined by rails 8 supported in fixed manner on pillars 11; by a powered carriage 9 designed to travel along rails 8 and supporting a powered carriage 12 designed to travel perpendicular to rails 8; and by a powered column 10 supported on carriage 12 so as to slide vertically and parallel to pillars 11, and in turn supporting laser head 6 at the bottom end. According to the preferred embodiment of the present invention, machine 1 also comprises a first powered coupling 14 at the bottom of column 10, and a second powered coupling 15 supported laterally on coupling 14. Said couplings 14 and 15 enable rotation of laser head 6 about the longitudinal axis of column 10, and about an axis 16 perpendicular to the longitudinal axis of column 10 and parallel to the axis along which carriage 12 travels. Laser head 6 is also preferably secured to coupling 15 by a powered slide 18 enabling adaptive movement of head 6 in relation to workpiece 2 along the axis of symmetry of head 6, however oriented in a plane perpendicular to axis 16. Mobile elements 9, 12, 10, 14, 15 and 18 are all controlled by a known numerical control (not shown). Laser head 6 is designed to receive in known manner (in the non-limiting example shown, by means of a known optical system (not shown) supported on structure 4) a laser beam 20 produced by known equipment (not shown), and to direct said beam 20 on to workpiece 2 together with a stream of gas 21 (shown schematically by the arrows) the nature of which depends on the type of operation (cutting or welding) being performed. In particular, laser head 6 comprises a nozzle 24 (shown in detail in FIGS. 2 and 3) through which beam 20 and stream 21 travel. Said stream 21 will be of oxygen or a similar oxidizing gas for cutting operations, or an inert gas such as argon or nitrogen for welding operations. Said stream of gas 21 is supplied to nozzle 24 along a pipe 25 and, according to the present invention, machine 1 comprises a servovalve 26 (controlled by a known electronic system (not shown) governing machine 1 as a whole) for selectively connecting pipe 25 to a pipe 27 supplying a first type of gas, e.g. oxidizing gas, or to a pipe 28 supplying a second type of gas, e.g. inert gas. Both pipes 27 and 28 are connected to appropriate pressure sources, e.g. pressurized tanks (not shown).

Nozzle 24 comprises a top portion 30 connected to laser head 6, and a bottom end portion defined, according to the present invention, by a tip 31 designed according to the type of operation being performed and, generally speaking, the type of workpiece 2. Machine 1 comprises at least two tips 31 of different length and internal geometry, and selectively connectable to top portion 30 for defining the bottom portion of nozzle 24 best suited geometrically to the type of operation in question. The same laser head 6 may thus be employed for both cutting and welding operations by selecting, in addition to the most suitable tip 31, also the type of gas required by means of valve 26. Similarly, using three or more tips 31, and by simply changing the same, the same laser head 6 may be employed for performing the same or different operations on different workpieces or portions of the same piece requiring a specific nozzle design, thus enabling the operation to be performed under the best possible conditions in a highly disturbed environment typical of laser processing (and characterised by high temperature, fumes and splash), while at the same time ensuring perfect optical, mechanical and flow concentricity of the pressurized gas.

For meeting the above requirements and automatically changing tips 31 on top portion 30, machine 1 according to the present invention comprises a nozzle refitting station 33 located inside work volume 5 and readily accessible by laser head 6 subsequent to displacement of the same by device 7. Station 33 may be installed in fixed manner inside work volume 5 (as shown in FIG. 1) or, according to a variation not shown, may be installed so as to move selectively, like worktable 3, in and out of work volume 5. Station 33 presents at least two identical supporting devices 34 (only one of which is shown in FIG. 1 and in detail in FIGS. 2 and 3) arranged, for example, side by side and each designed to support a standby tip 31. For automatically changing tips 31, nozzle 24 and devices 34 present releasable means for gripping and securing tips 31 integral with nozzle 24 or one of the devices 34; as well as means for selectively connecting/disconnecting said gripping means as required. Tips 31 may thus be changed by simply moving head 6 up to an empty device 34 in station 33; releasing tip 31 on to said device 34; moving head 6 over to the second device 34 supporting the other tip 31; and withdrawing said other tip 31, thus leaving said second device 34 empty for receiving back the withdrawn tip 31. Nozzle 24, and consequently also component elements 30 and 31, must also be designed to function as a capacitive sensor, for controlling adaptive displacement by slide 18 and so maintaining nozzle 24 at the same distance from the surface of workpieces 2 presenting minor surface defects, such as puckering caused by local distortion of workpieces 2 of relatively thin sheet metal. For this purpose, connecting portion 30 presents an external inductor 36 protected by a cap 37 and connected, for example, to a known resonant LC circuit (not shown) in turn connected to the electronic system controlling machine 1. Provision must therefore be made for ensuring optimum contact of elements 30 and 31, and connection of the same for sufficiently reproducing the electrical characteristics of nozzle 24 as a whole whenever the same tip 31 is removed and replaced. For this purpose, tips 31 are selectively connectable to element 30 by means of respective bayonet connectors 40 and 41 connected/disconnected by a system on machine 1 consisting of means enabling selective rotation and relative travel of nozzle 24 and devices 34. According to a first embodiment, station 33 may present a motor 43 for selectively rotating supporting devices 34 about an axis parallel to the axis of symmetry of nozzle 24 when this is positioned facing and coaxial with one of devices 34 by means of three-axis positioning device 7. In this case, relative travel is achieved by device 7, but it may also be achieved by motor 43 moving devices 34. According to the preferred embodiment of the present invention, however, relative displacement for connecting/disconnecting connectors 40 and 41 is controlled directly by the system governing head 6, and using, in addition to device 7, also rotary couplings 14 and 15, i.e. the two additional numerical control axes provided on machine 1 according to the present invention and which are absent on most standard robot handling devices.

As shown in FIGS. 4 to 7, each tip 31 presents a first and second series of external radial tabs 45 and 46, both equally spaced in a ring. Tabs 45 are designed to cooperate with a series of respective L-shaped teeth 47 projecting frontwards and equally spaced in a ring about the bottom end 48 of portion 30 of nozzle 24, preferably secured to portion 30 in removable manner by means of a threaded coupling projecting from cap 37. Tabs 46, on the other hand, are designed to cooperate with a second series of respective L-shaped teeth 49 similar to 47 and equally spaced in a ring inside a seat 50 on each supporting device 34 in station 33.

End 48 supports a ring 52 designed to slide parallel to teeth 47 and against the action of elastic means defined by a helical spring 51 housed inside cap 37. Ring 52 comprises a series of axial tabs 53 (only one of which is shown in FIGS. 2 and 3) equally spaced in a ring so as to slide between adjacent teeth 47; and an annular shoulder 54 designed to contact edge 55 of seat 50 on each supporting device 34. Spring 51, which is inserted between ring 52 and a shoulder 56, normally maintains ring 52 in the extracted position contacting a shoulder 57 formed on end 48 at the base of teeth 47, and wherein tabs 53 are inserted between and substantially over the full height of teeth 47.

Inside seat 50 on each device 34, there is fitted a pin 59 designed to slide axially between and parallel to adjacent teeth 49 against the action of a helical spring 60 housed inside a recess 61 formed at the base of seat 50 and closed by a threaded cap 62. On the side opposite spring 60, pin 59 cooperates head-on with a pin 64 housed, in sliding manner and projecting from edge 55, inside a hole 65 formed adjacent to seat 50. Said pin 64 (FIG. 3) cooperates frontally with a shoulder surface 66 on portion 30 of nozzle 24, designed to receive interchangeable tip 31 and, in the example shown, defined by the front surface of cap 37. According to the preferred embodiment of the present invention, tabs 45 and 46 of each tip 31 are four in number, and so shaped and arranged as to form a Maltese cross (plan view). To ensure a constant angular position of tip 31 in relation to connecting portion 30, and so guarantee the repeatability of the electromagnetic characteristics of nozzle 24 as a whole, each series of tabs 45 and 46 comprises a respective smaller tab 45a and 46a. Similarly, each series of teeth 47 and 49 comprises a tooth having a lateral internal check pin numbered 77 and 79 respectively.

Finally, it should be noted that, whereas tabs 45 and 46 present the same angular position, teeth 47 and 49 are angularly offset by an amount equal to the tab pitch, in the example shown, by 45°.

Machine 1 as described above operates as follows. When machine 1 is idle, station 33 supports, for example, two different tips 31, one for welding and the other for cutting, and each supported on a device 34; head 6 presents only portion 30 of nozzle 24; tabs 46 are engaged beneath teeth 49; and pin 79 and pin 59, which is maintained by spring 60 in the extracted position between two teeth 49, prevent rotation of tips 31 by virtue of arresting tabs 46. When activated, machine 1 moves head 6 up to one of devices 34 to withdraw the tip 31 required for the operation in question. Head 6 is positioned with portion 30 coaxial with tip 31 by the numerical control positioning systems on machine 1, in that station 33 is located inside work volume 5 and its coordinates memorised in the electronic control system governing machine 1. At this point, withdrawal is effected by traversing and relatively rotating, in the appropriate direction, tip 31 on device 34 and nozzle portion 30. This may be effected by rotating and traversing device 34 or, as in the example shown, using the powered head control devices (device 7 and rotary couplings 14 and 15), i.e. by maintaining device 34 stationary and moving only nozzle portion 30. In particular, head 6 is lowered for inserting projecting end 48 inside seat 50. This results, on the one hand, in withdrawal of pin 52 (by virtue of projection 54 contacting edge 55) by a sufficient amount to release tabs 53 from between teeth 47, and, on the other, in withdrawal of pin 59 inside recess 61 (by virtue of pin 64 contacting surface 66 and being forced by the downward movement of portion 30 inside hole 65) by a sufficient amount to release pin 59 from between teeth 49. Subsequent to downward movement of head 6, nozzle 24 and device 34 are positioned with teeth 47 inserted inside the gaps between teeth 49, on a level with tabs 45. At this point, laser head 6 is rotated 90° in the direction of the arrow in FIG. 3, the first 45° of which rotation engages tabs 45 beneath teeth 47, and the second 45° of which releases tabs 46 from beneath teeth 49, so as to switch from the FIG. 5 to the FIG. 4 configuration. Subsequent to the first 45° rotation of portion 30 in the direction of the arrow, tab 45a contacts 77 (FIG. 7) so that the next 45° rotation of portion 30 also rotates tip 31, thus releasing tabs 46. Subsequent withdrawal of end 48 from seat 50 therefore also results in withdrawal, together with end 48, of tip 31, which is then angularly locked on to portion 30 by spring 51 forcing ring 52 downwards. Upon head 6 withdrawing from device 34 (FIG. 2 configuration), nozzle 24 is complete and ready for use, while seat 50 is empty.

Figure 6:
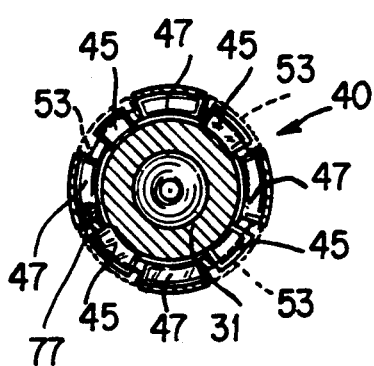
FIGS. 6 and 7 show respective sections of the FIG. 3 details along line VI—VI.
Figure 7:
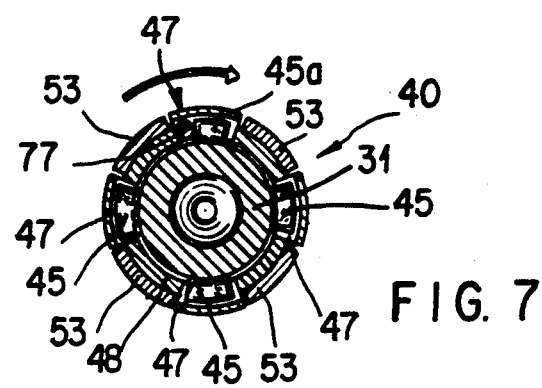

For changing tip 31, nozzle 24 is simply set to the FIG. 2 position and lowered towards devices 34 for inserting tip 31 inside seat 50. As in the previous case, downward movement of nozzle 24 results in withdrawal of pin 59 and ring 52, thus positioning nozzle 24 and device 34 as shown in FIG. 3. At this point, portion 30 is rotated in the opposite direction, as shown by the arrows in FIGS. 4 and 7. During the first 45° rotation, tip 31, which is rotated by end portion 48 by virtue of pin 77 cooperating with tab 45a (FIG. 7), causes tabs 46 to engage teeth 49 (FIG. 4), subsequent to which, tab 46a contacts pin 79, thus preventing rotation of tip 31. Further 45° rotation of end portion 48 therefore releases tabs 45 from teeth 47 (FIG. 6). Subsequent withdrawal of end portion 48 from seat 50 results in detachment of component elements 31 and 30 of nozzle 24, tip 31 remaining locked inside seat 50 by virtue of tabs 46 engaging teeth 49. Withdrawal of portion 30 also results in upward movement of pin 59, for angularly locking tip 31 against pin 79 in seat 50 and so preventing accidental rotation of pin 31 inside seat 50. In the same way as already described, the replacement tip 31 is then withdrawn from the other device 34, at the same time activating valve 26.

The advantage of the present invention will be clear from the foregoing description. By simply providing for station 33 and modifying the design of nozzle 24, which is formed in two parts, one of which (tip 31) is interchangeable, machine 1 provides for switching fully automatically, and without stopping the machine, from welding to cutting operations or vice versa, as well as for adapting the geometry of the nozzle to that of the workpiece (or portions of the same) within the same operation. Machine 1 according to the present invention therefore provides for a high degree of versatility combined with low cost and a high degree of reliability.

We claim:

1. A laser machine for performing mechanical operations, in particular cutting and welding, said machine comprising a laser head (6) having a nozzle (24) supplying a laser beam and a stream of gas suitable for the operation being performed; and means (4) for moving said laser head (6) relatively in space, within a given work volume, in relation to at least one workpiece;

wherein said nozzle (24) comprises a removable end portion (31) designed according to the type of operation being performed; said machine further comprising:
   (i) a nozzle refitting station (33) located inside said work volume and comprising at least two supporting devices (34) for respective nozzle tips (31) of different design, selectively fittable integral with said nozzle (24) for defining said removable end portion of the same;
   (ii) bayonet connectors (10,41) for selectively connecting said nozzle tips (31) to said nozzle (24) and to said supporting devices (34) of the refitting station respectively;
   (iii) means (77-79,53-47,59-49) for releasably angularly connecting in selective manner said nozzle tips (31) with said nozzle (24) and with said supporting devices (34) respectively for rendering the nozzle tips (31) angularly rigid therewith in a predetermined angular direction; and
   (iv) control means (4,14,15,43) for rotating and relatively traversing said nozzle (24) and said supporting devices (34) in said predetermined angular direction.

2. A machine as claimed in claim 1, characterised by the fact that said control means comprise at least a respective motor (43) for selectively rotating said supporting devices (34) about an axis parallel to the axis of symmetry of said nozzle (24).

3. A machine as claimed in claim 1, characterised by the fact that said control means consist of said means for moving said laser head (6) within said work volume; said means comprising a device (7) for moving said laser head (6) along three cartesian axes, and respective powered couplings (14, 15) for rotating said laser head (6) about two perpendicular axes parallel to two of said three cartesian axes.

4. A machine as claimed in claim 2, characterised by the fact that each said tip (31) presents a first and second series of external radial tabs (45, 46); the tabs in each said series being equally spaced in a ring, and cooperating beneath a respective first and second series of L-shaped teeth (47, 49) projecting frontwards and respectively equally spaced in a ring about a portion (30) connecting said nozzle (24) to said laser head (6), and inside a seat (50) on each supporting device (34) of said station (33).

5. A machine as claimed in claim 4, characterised by the fact that said portion (30) connecting said nozzle (24) to said laser head (6) supports a ring (52) sliding parallel to said first series of teeth against the action of elastic means (51), and comprising a series of axial tabs (53) equally spaced in a ring and each designed to slide between adjacent said teeth (47) in said first series; and an annular shoulder (54) designed to contact the edge (55) of said seat (50) on each said supporting device (34) subsequent to relative displacement of said supporting device (34) in relation to said nozzle (24), so as to withdraw said ring (52) by a sufficient amount to enable engagement of said teeth (47) on said connecting portion (30) of said nozzle (24) and said first series of tabs (45) on said tip (31).

6. A machine as claimed in claim 4, characterised by the fact that, inside each said seat (50) and between two said teeth (49) in said second series, there is provided a pin (59) designed to slide axially parallel to said teeth (49) against the action of second elastic means (60), and cooperating, at the opposite end, with a sliding pin (64) in turn cooperating frontally with a shoulder surface (66) of said connecting portion (30) of said nozzle (24) subsequent to relative displacement of said nozzle (24) in relation to said seat (50), so as to withdraw said pin by a sufficient amount to enable engagement of said teeth (49) in said seat (50) and said second series of tabs (46) on said tip (31).

7. A machine as claimed in claim 5, characterised by the fact that said tabs in said first and second series are arranged in such a manner as to form a Maltese cross; each said series of tabs comprising a smaller tab (45a, 46a), and each said series of teeth comprising a tooth having an internal lateral check pin (77, 79).

8. A machine as claimed in claim 7, characterised by the fact that said connecting portion (30) of said nozzle (24) presents an external inductor (36) enabling said nozzle (24) to function as a capacitive sensor; said laser head (6) being mounted on a powered slide (18) enabling adaptive movement of said laser head (6) along its axis of symmetry.

9. A machine as claimed in claim 1 characterised by the fact that it comprises a valve (26) for selectively connecting a pipe (25) supplying fluid to said nozzle (24) with at least a first and second pipe (27, 28) supplying a first and second gas.

* * * * *

UNITED STATES PATENT AND TRADEMARK OFFICE
CERTIFICATE OF CORRECTION

PATENT NO. : 5,101,089
DATED : March, 31, 1992
INVENTOR(S) : Virgilio Bortolotto et al It is certified that error appears in the above-identified patent and that said Letters Patent is hereby corrected as shown below:

On the title page, Item [73]:
Assignee reads: Prima Industries S.p.A., Turin, Italy should read:

--Prima Industrie S.p.A., Turin, Italy--

Signed and Sealed this

Second Day of November, 1993

*Attest:*

BRUCE LEHMAN

*Attesting Officer*     *Commissioner of Patents and Trademarks*